(12) United States Patent
Hausner et al.

(10) Patent No.: US 11,235,878 B2
(45) Date of Patent: Feb. 1, 2022

(54) STORAGE COMPARTMENT AND LATCH THEREFOR

(71) Applicant: Sell GmbH, Herborn (DE)

(72) Inventors: Dennis Hausner, Herborn (DE);
Thomas Schaefer, Ebdorfergrund (DE);
Thomas Wiegand, Homberg (DE)

(73) Assignee: SAFRAN CABIN GERMANY GMBH, Herborn (DE)

( * ) Notice: Subject to any disclaimer, the term of this patent is extended or adjusted under 35 U.S.C. 154(b) by 927 days.

(21) Appl. No.: 15/554,722

(22) PCT Filed: Mar. 7, 2016

(86) PCT No.: PCT/EP2016/054759
§ 371 (c)(1),
(2) Date: Aug. 31, 2017

(87) PCT Pub. No.: WO2016/142328
PCT Pub. Date: Sep. 15, 2016

(65) Prior Publication Data
US 2018/0079506 A1    Mar. 22, 2018

Related U.S. Application Data

(60) Provisional application No. 62/129,265, filed on Mar. 6, 2015.

(51) Int. Cl.
*B64D 9/00* (2006.01)
*B64D 11/04* (2006.01)

(52) U.S. Cl.
CPC .............. *B64D 9/003* (2013.01); *B64D 11/04* (2013.01)

(58) Field of Classification Search
CPC ................................ B64D 9/003; B64D 11/04
See application file for complete search history.

(56) References Cited

U.S. PATENT DOCUMENTS

| | | | |
|---|---|---|---|
| 3,810,534 A | 5/1974 | Prete, Jr. | |
| 3,986,460 A | 10/1976 | Voigt | |
| 4,415,298 A * | 11/1983 | Voigt | B64D 9/003 244/137.3 |
| 5,090,638 A | 2/1992 | Eilenstein-Wiegmanns | |
| 6,488,457 B2 * | 12/2002 | Diamante | B64D 11/0696 410/46 |
| 7,731,460 B2 * | 6/2010 | Brown | B64D 9/003 410/77 |
| 10,118,700 B2 * | 11/2018 | Kuppan | F03G 7/065 |
| 2009/0016838 A1 * | 1/2009 | Roberts | B60P 7/0892 410/69 |
| 2009/0016839 A1 * | 1/2009 | Roberts | B64D 9/003 410/69 |

* cited by examiner

*Primary Examiner* — Brian M O'Hara
(74) *Attorney, Agent, or Firm* — Andrew Wilford

(57) ABSTRACT

A latch assembly (1) is presented which comprises a safety latch (2) and a trigger latch (4). The safety latch (2) is releasable to raise from a lowered end position into a raised end position for, in use with an object, locking the object. The trigger latch (4) is adapted for fixing the safety latch (2) in its lowered end position and operable for releasing the safety latch (2). The safety latch (2) is adapted to be reset from its raised end position into its lowered end position for unlocking the object. Moreover, a storage compartment having at least one latch assembly (1) is presented.

11 Claims, 4 Drawing Sheets

STORAGE COMPARTMENT AND LATCH THEREFOR

CROSS REFERENCE TO RELATED APPLICATIONS

This application is the US-national stage of PCT application PCT/EP2016/054759 filed 1 Mar. 2015, published 15 Sep. 2016 as WO 2016/142,328, and based on U.S. provisional application 62/129,265 filed 6 Mar. 2015.

FIELD OF THE INVENTION

The present invention relates to a latch assembly and a storage compartment comprising the latch assembly. In particular, the present invention relates to securing boxes also known as standard units, successively to be inserted into a storage compartment and placed one after the other in a galley of an airplane.

BACKGROUND OF THE INVENTION

Due to strict safety requirements for airplanes it is important to secure boxes in a storage compartment against unallowed movement. Regarding storage compartments in which two boxes are to be inserted successively, i.e. one after another, it is important to secure the box inserted first which is moved from a front portion to a back portion of the storage compartment by inserting the second box in the insertion direction. Nowadays, the box inserted first is secured in the storage compartment by manually raising a safety latch provided within the storage compartment in a position between the intended parking positions of the first box and the second box. The raised safety latch blocks movement of the first box in reverse insertion direction towards the second box or towards a front door of the storage compartment. In order to remove the box inserted first and secured by the raised safety latch, it is necessary to manually lower the safety latch.

The processes of manually raising and lowering the safety latch are time-consuming. Moreover, a person responsible for securing the box in the storage compartment might forget to raise the safety latch. Furthermore, both of the two boxes can only be inserted into the storage compartment if the safety latch has been manually reset to the initial lowered end position. These aspects might result in severe safety issues.

OBJECT OF THE INVENTION

Therefore, it is an object of the present invention to provide a latch assembly and a storage compartment comprising such latch assembly which are capable of automatically raising the safety latch and allowing resetting the safety latch.

SUMMARY OF THE INVENTION

According to one aspect of the present invention, there is provided a latch assembly comprising a safety latch and a trigger latch. The safety latch is releasable to raise from a lowered end position into a raised end position. After being released, the safety latch may be held in its raised end position by a force, e.g. by an elastic force of a spring. The safety latch is adapted for, in its raised end position and in use with an object, securing the object. The term of locking the object means in particular stopping a movement of the object in a direction towards the raised safety latch and/or stopping a movement of the object pushing against the raised safety latch. In its lowered end position, the safety latch is not adapted for locking or stopping the object, and the object is movable, preferably across the safety latch, along a direction to be blocked by the raised safety latch. Preferably, the safety latch is adapted for blocking a movement of the object in a direction towards the raised safety latch. For a scenario of inserting the object, such as a box, in an insertion direction into a storage compartment comprising the latch assembly, the blocking direction corresponds to the reverse insertion direction. The trigger latch is adapted for, preferably in its raised end position, fixing the safety latch in its lowered end position. Furthermore, the trigger latch is operable for releasing the safety latch, preferably when the trigger latch is pushed to its lowered end position by the object in use with the latch assembly. The safety latch is adapted to be reset from its raised end position into its lowered end position for unlocking the object.

Regarding a scenario of the latch assembly mounted to the surface of an interior wall of a storage compartment for storing at least one object, such as a box, wherein the latch assembly is adapted for locking or stopping the object which has been fully inserted along an insertion direction into a storage volume of the storage compartment, the term of the raised end position of the safety latch refers to a safety latch that physically extends into the storage volume to such extent as being able to lock or stop the inserted object against movement in reverse insertion direction. The term of the lowered end position of the safety latch refers to a safety latch which allows a movement of the object along the insertion direction and the reverse insertion direction across the safety latch. In its lowered end position, the safety latch preferably does not physically extend into the storage volume. Similarly, the term of the raised end position of the trigger latch refers to a trigger latch that physically extends into the storage volume to such extent as being able to be operated, e.g. pushed or pivoted, during insertion of the object into the storage volume, by the object from its raised end position to its lowered end position. The term of the lowered end position of the trigger latch refers to a trigger latch which allows a movement of the object along the insertion direction and reverse insertion direction across the safety latch. In its lowered end position, the trigger latch preferably does not physically extend into the storage volume.

The object for use with the latch assembly may be, without any constraint, a box or a container, in particular suitable for use in an airplane. The term box used above and below does not imply any restrictions to the shape and physical dimensions of an object embodying the box. Generally, the term "box" represents any object intended for use with the presented assembly latch or the presented storage compartment.

The presented latch assembly in use with a storage compartment for storing boxes (in this case the object to be used with the latch assembly corresponds to a box) enables automatically, i.e. without manual operation of a user, securing a box that has been moved in an insertion direction across the latch assembly including pushing the trigger latch to its lowered end position, and finally releasing and enabling raising the safety latch when the box arrives at its intended storage position. Moreover, the latch assembly allows resetting the safety latch to its lowered end position so that the box can be removed in reverse insertion direction by moving the box again across the latch assembly. After removal of the box, the latch assembly is automatically reset to its initial condition with the trigger latch in its raised end position and the safety latch in its lowered end position.

The latch assembly may further comprise a securing member for securing the safety latch in its lowered end position, when the securing member is enabled. The securing member may comprise a securing pin extended by a relaxed compression spring when enabled. Being enabled, the securing pin e.g. engages with a recess of the safety latch in its lowered end position. Thus, the safety latch is secured in its lowered end position when the securing member is enabled.

Regarding the latch assembly including the securing member, the trigger latch is adapted for enabling and/or disabling the securing member. When disabled, the securing member is not capable of securing the safety latch in its lowered end position. The trigger latch may disable the securing member e.g. by fixing the securing pin to its retracted state with compressed compression spring. The trigger latch may enable the securing member by stopping the fixing of the securing pin, i.e. by releasing the securing pin.

Preferably, the trigger latch is adapted for, when being operated, first releasing the safety latch and subsequently enabling the securing member. This sequence order allows to use the enabled securing member for securing the safety latch in its lowered end position when resetting the safety latch into its lowered end position.

Preferably. the trigger latch is adapted to be operated by pushing, preferably by the object, e.g. a box, in use with the latch assembly, the trigger latch from a raised end position into a lowered end position. This allows to automatically release the safety latch by pushing an object to be used with the latch assembly against the trigger latch and/or moving such object across or against the trigger latch including pressing the trigger latch down to its lowered end position. The trigger latch may be adapted, when in its raised end position, for fixing the safety latch in its lowered end position and disabling the securing member, and, when reaching or in its lowered end position, for first releasing the safety latch and subsequently enabling the securing member. The lowered end position of the trigger latch may correspond to a compressed trigger latch, and the raised end position of the trigger latch may correspond to a relaxed or extended trigger latch.

In a preferred latch assembly, the safety latch is raisable, e.g. by an elastic force, from its lowered end position to its raised end position in particular by pivoting about a first axis. Alternatively or optionally the trigger latch is operable by being pivoted, preferably by the object in use with the latch assembly counteracting an elastic force intended to hold the trigger latch in its raised end position, about a second axis. The second axis is preferably different from the first axis.

An orientation of the first axis and an orientation of the second axis may set up an angle within a range of 45 to 135 degree. Preferably, the angle is within 70 to 110 degree. More preferably, the angle is between 85 and 95 degree.

Preferably, the first axis is transversal to the second axis. Regarding the above mentioned scenario of the latch assembly mounted to the surface of an interior wall of a storage compartment for storing at least one object, the first axis may be oriented along the insertion direction of the object.

Preferably, at least one of the safety latch, the trigger latch, and the securing member is supported adjustably along an adjustment direction which preferably corresponds to the orientation of the first axis which in turn, for the scenario mentioned above, corresponds to the insertion direction of the object. For implementing the adjustment capability, the latch assembly may comprise a supporting member for supporting the safety latch movably along the first axis. Preferably, the supporting member is further adapted for supporting the securing member movably along the first axis. More preferably, the supporting member is further adapted for supporting also the trigger latch movably along the first axis. The latch assembly having the above mentioned supporting member may further comprise a shaft which is rotatable for moving, by converting the rotation into a translatory movement, the supporting member along the first axis and guiding movement of the supporting member. Preferably, the shaft extends along the first axis.

A resetting member may be operable for retracting, e.g. pivoting, the safety latch from its raised end position into its lowered end position. A stable resetting is achieved when the securing member is enabled prior to resetting. In this case, the enabled securing member will secure the safety latch when it reaches its lowered end position.

The safety latch may be configured to be reset by a user operating a dedicated resetting member which is connected or connectable to the safety latch or part of the safety latch. Alternatively or optionally the safety latch may embody the resetting member such that the safety latch is configured to be reset by a user manually moving or pivoting the safety latch from its raised end position into its lowered end position. In one embodiment, the safety latch being operable as the resetting member is a projection component of the latch assembly. In this case, as the safety latch projects from the remaining body of the latch assembly, the safety latch can be easily manually accessed by a user for resetting the safety latch to its lowered end position. The operation of the user may alternatively be performed by operation of an actuator. The resetting member may comprise or be connected to a shaft for coupling the resetting member to the safety latch, wherein the shaft is connected or connectable to the pivot point of the safety latch. Preferably, the shaft passes through the pivot point of the safety latch. Furthermore, the shaft preferably extends along the pivot axis of the safety latch.

The latch assembly may comprise a frame which supports the safety latch and the trigger latch. An upper end of the safety latch in its lowered end position and/or an upper end of the trigger latch in its lowered end position do preferably not extend beyond an upper surface of the frame. This is in particular useful for sliding, e.g. during inserting into a storage compartment or removing from the storage compartment, an object, e.g. a box, across the latch assembly mounted in the storage compartment.

According to another aspect of the present invention, there is provided a storage compartment for storing, in its storage volume, at least one box to be inserted into the storage compartment in an insertion direction. The storage compartment is preferably suitable for use in an airplane. The storage compartment comprises at least one latch assembly according to the first aspect mentioned above. The at least one latch assembly is arranged within the storage compartment for locking an inserted box, i.e. blocking movement of an inserted box in reverse insertion direction. The proposed latch assembly is in particular suitable for an airplane, because its securing capability and performance is not restricted to a specific mounting orientation of the latch assembly with respect to the gravitational pull of earth, i.e. the presented latch assembly can be mounted to a sidewall, bottom wall, and ceiling wall of a storage compartment.

The above storage compartment may be adapted for storing at least two boxes to be inserted successively in an insertion direction. In the storage compartment there may be an individual latch assembly assigned to each of the at least two boxes. According to a first alternative, there is no latch assembly provided for the box to be inserted last. According to a second alternative, there is also a latch assembly provided for the box to be inserted last. This second alternative may even be provided for a storage compartment designed for storing only one box. When inserting the single box, the box can be automatically secured by the presented latch assembly in its intended storage position without any urgent need for a manual operation like closing a front door of the storage compartment. Regarding the second alternative, the safety latch provided for the box to be inserted last is preferably operable as a resetting member for resetting the safety latch into its lowered end position and is preferably configured as a component projecting from the remaining latch assembly.

Furthermore, the storage compartment may be adapted for storing exactly two boxes to be inserted successively in the insertion direction. In use with the two boxes the latch assembly is arranged for locking the firstly inserted box, preferably by blocking movement of the firstly inserted box in reverse insertion direction.

Regarding the storage compartment, each safety latch may be raisable transverse to the insertion direction, preferably by pivoting about a first axis oriented similar to or same as the insertion direction. Each trigger latch is preferably arranged within the storage compartment to be operable by insertion of a box. Inserting a box into the storage compartment will operate the trigger latch. The inserted box pushes the trigger latch downwards in the direction of the insertion. Thus, the trigger latch is pushed from its raised end position, in which the trigger latch fixes the safety latch to its lowered end position, to its lowered end position. This in turn will release the safety latch. However, the box still in the process of being inserted into the storage compartment is in physical contact with both the trigger latch and the safety latch and pushes both of them down to their respective lowered end position. Having reached the intended storage position, the box loses only physical contact to the safety latch but not to the trigger latch. Thus, the safety latch raises, e.g. driven by an elastic force, from its lowered end position to its raised end position for securing the box against movement in the reverse insertion direction.

According to still another aspect of the present invention, there is provided a wall component or partition wall component for one of the above storage compartments comprising at least one of the above latch assemblies.

BRIEF DESCRIPTION OF DRAWINGS

In the following, several embodiments of the present invention are described with reference to the following drawings. Same or similar components will be denoted with the same reference numerals throughout the drawings.

SPECIFIC DESCRIPTION OF THE INVENTION

Figure 1:
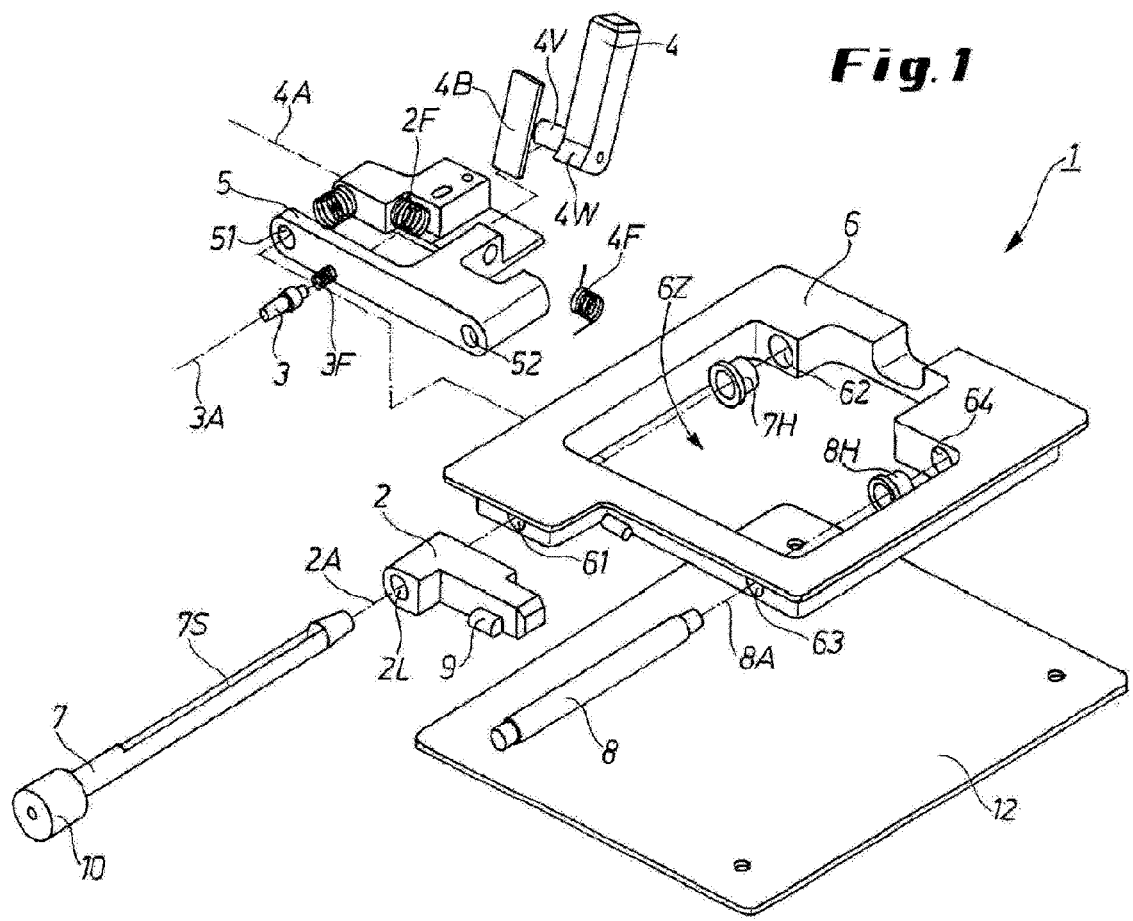
FIG. 1 is an exploded view of a latch assembly according to one embodiment of the present invention.

FIG. 1 is an exploded vies of a latch assembly according to one embodiment of the present invention. The latch assembly 1 comprises a safety latch 2 which is raisable, in more detail pivotable about a first axis 2A, from a lowered end position illustrated in FIG. 1 to a raised end position by an elastic force of a torsion spring 2F. In the lowered end position of the safety latch 2, the torsion spring 2F is tensioned, whereas the torsion spring 2F in the raised end position of the safety latch 2 is relaxed. Rotation from the lowered end position to the raised end position of the safety latch 2 corresponds to a rotation angle of approximately 90 degree.

A frame 6 has an opening 6Z, a through hole 61 and a hole 62 centered on the first axis 2A. A rotatable shaft 7 extending along the first axis 2A passes the through hole 61, and one end of the shaft 7 is supported by a bushing 7H inserted into hole 62. The frame 6 has other through holes 63 and 64 centered on an axis 8A substantially parallel to the first axis 2A. A shaft 8 extending along the axis 8A passes the through the hole 63, and one end of the shaft 8 is supported by a bushing 8H inserted into the hole 64. The shaft 7 and the shaft 8 are substantially parallel to each other and pass through through holes 51 and 52, respectively, of a supporting member 5 for supporting the support member 5 movably in the opening 6Z of the frame 6 along the direction or orientation of the first axis 2A. An upper surface of the frame 6 is coplanar with an upper face of the safety latch 2 in its lowered end position and/or with an upper face of a trigger latch 4 in its lowered end position. The frame 6 is mounted to a bottom plate 12.

The supporting member 5 supports the safety latch 2 pivotable about the first axis 2A. Furthermore, the supporting member 5 supports the trigger latch 4 pivotable about the second axis 4A extending transversely to the first axis 2A. The trigger latch 4 is pivotable about the axis 4A from a raised end position illustrated in FIG. 1 to a lowered end position against an elastic force of a leg 62 of the spring 4F. In the lowered end position of the trigger latch 4, the torsion spring 4F is tensioned, whereas the torsion spring 4F in the raised end position of the trigger latch 4 is relaxed. Rotation from the lowered end position to the raised end position of the trigger latch 4 corresponds to a rotation angle within the range of 60 to 80 degree, preferably approximately 70 degree. A contact plate 4B fixed to the trigger latch 4 on the side of intended contact with a box or container is provided for preventing damage of the trigger latch 4 caused by the box or container pressing against the trigger latch 4 when lowering the trigger latch 4.

The supporting member 5 has a recess (not shown) adjacent to the trigger latch 4, for accommodating a securing member 3 movably against an elastic force of a compression spring 3f along a direction 3A parallel to the first axis 2A. The securing member 3 is a securing pin adapted to engage with the safety latch 4 in its lowered end position when the compression spring 3f is in its relaxed state, and for releasing the safety latch 4 when the compression spring 3f is in its compressed state.

The trigger latch 4 comprises a first projection 4W for clamping the safety latch 2 in its lowered end position, when the trigger latch 4 is in its raised end position. Furthermore, the trigger latch 4 comprises a second projection 4V adjacent to the first projection 4W for clamping the securing member 3 in its disabled state with the compression spring 3F compressed. The projections 4W and 4V are so constructed that the trigger latch 4, when pivoted from its raised end position to its lowered end position, first releases the safety latch 2 and subsequently releases the securing member 3.

Connected to an end of the shaft 7 distant from the bushing 7H is a resetting member 10. The resetting member 10 is a rotatable knob fixed to the shaft 7. If the shaft 7 passing through a through hole 2L at the pivot point of the safety latch 2 is rotationally coupled with the safety latch 2, then pivoting the resetting member 10 will not only rotate the shaft 7 but will also pivot the safety latch 2. If the resetting member 10 is rotated clockwise, the safety latch 2 is pivoted from its raised end position to its lowered end position. When the safety latch 2 reaches its lowered end position, it is secured in this position by the securing member 3.

If the shaft 7 is not physically connected to the safety latch 2, the safety latch 2 cannot be pivoted by operating the resetting member 10. In this case rotating the shaft 7 which has a threaded profile 7S extending along the first axis 2A on its outer circumference will move the supporting member 5 supporting the safety latch 2, the securing member 3, and the trigger latch 4, along the first axis 2A. Thus the position of the safety latch 2, the securing member 3, and the trigger latch 4 relative to the frame 6 can be adjusted in the direction of the first axis 2A. Whether or whether not the shaft 7 is physically connected to the safety latch 2 can be manipulated by a decoupling unit 9 included in the safety latch 2.

Figure 2:
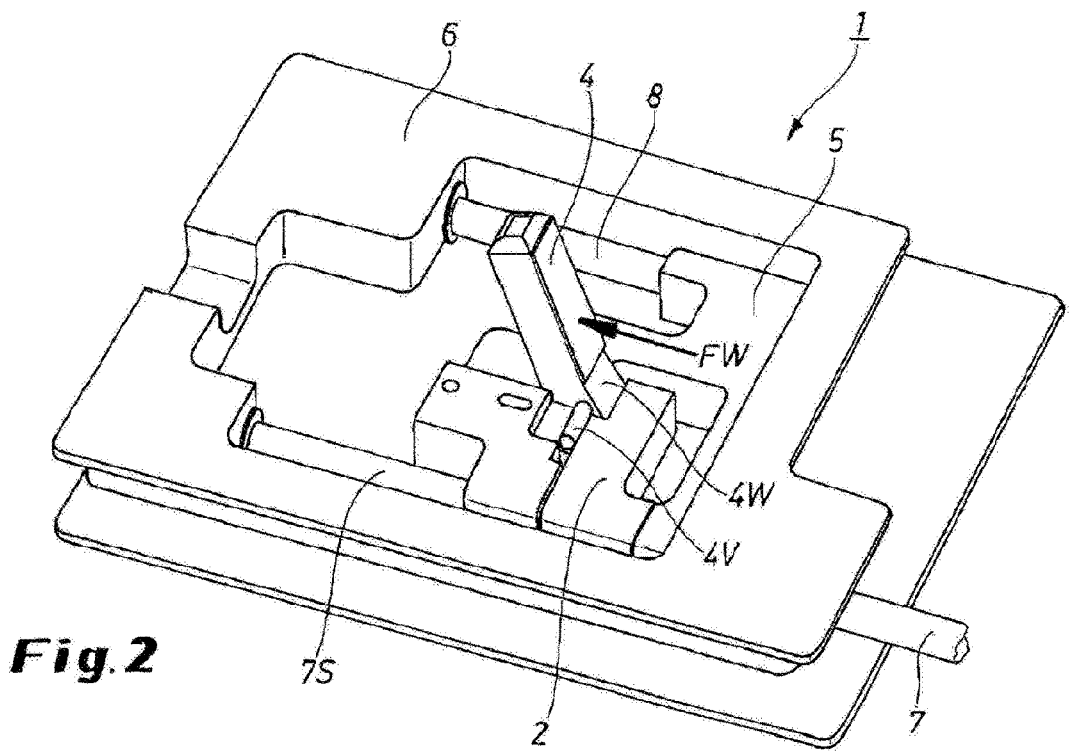
FIG. 2 is a three-dimensional view of a part of a latch assembly with the trigger latch in its raised end position according to one embodiment of the present invention.

FIG. 2 is a three-dimensional view of a part of the latch assembly 1 with the trigger latch 4 in its raised end position. The safety latch 2 is clamped in its lowered end position by the first projection 4W of the trigger latch 4. The trigger latch 4 is in its raised end position and can be pushed down by a force, exerted by an object (not shown) pushing the trigger latch 4, in a direction as indicated by arrow FW. Direction FW corresponds to the insertion direction.

Figure 3:
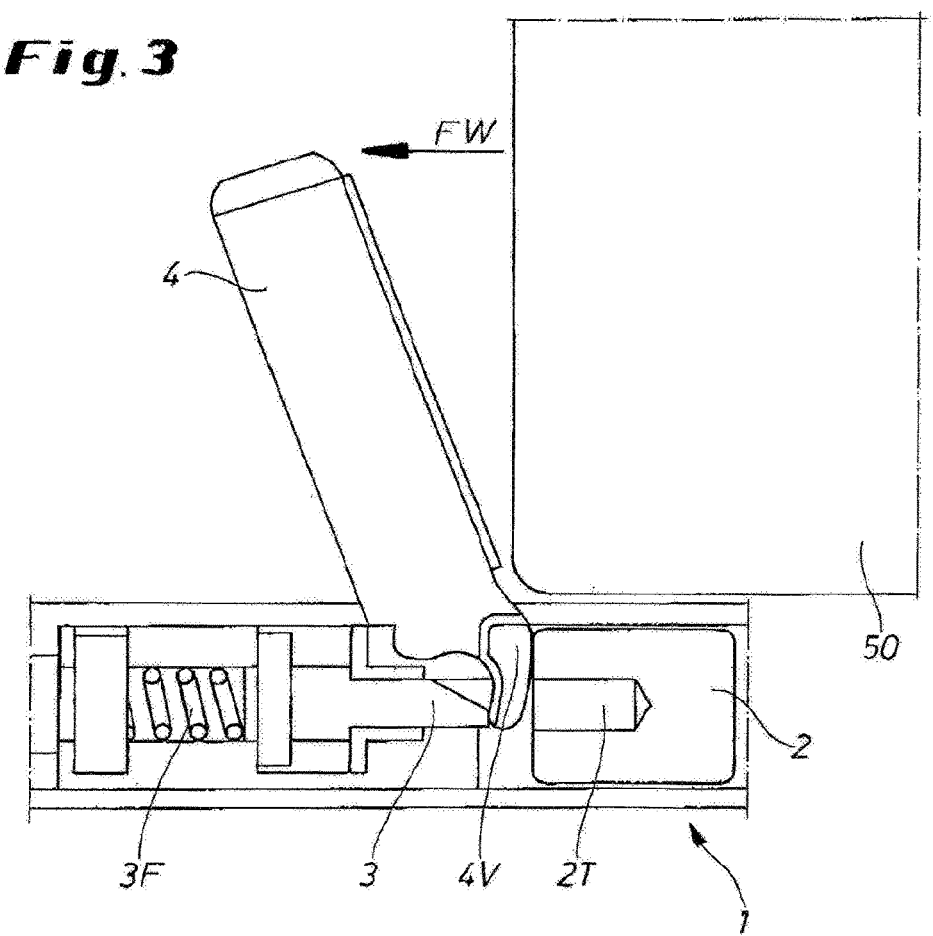
FIG. 3 is a two-dimensional cross-sectional view of a part of a latch assembly with the trigger latch in its raised end position according to one embodiment of the present invention.

FIG. 3 is a two-dimensional cross-sectional view corresponding to the situation shown in FIG. 2. The securing member 3 is disabled by being clamped by the second projection 4V of the trigger latch 4. Moreover, a box 50 is partially shown which will be pushed against the trigger latch 4 in direction FW in order to push down trigger latch 4. When inserting the box 50 into a storage compartment comprising the latch assembly 1, the box 50 will slide over the trigger latch 4, pushing it down. Having arrived in the intended storage position as shown in FIG. 4, the trigger latch 4 continues to be held down by the box 50.

Figure 4:
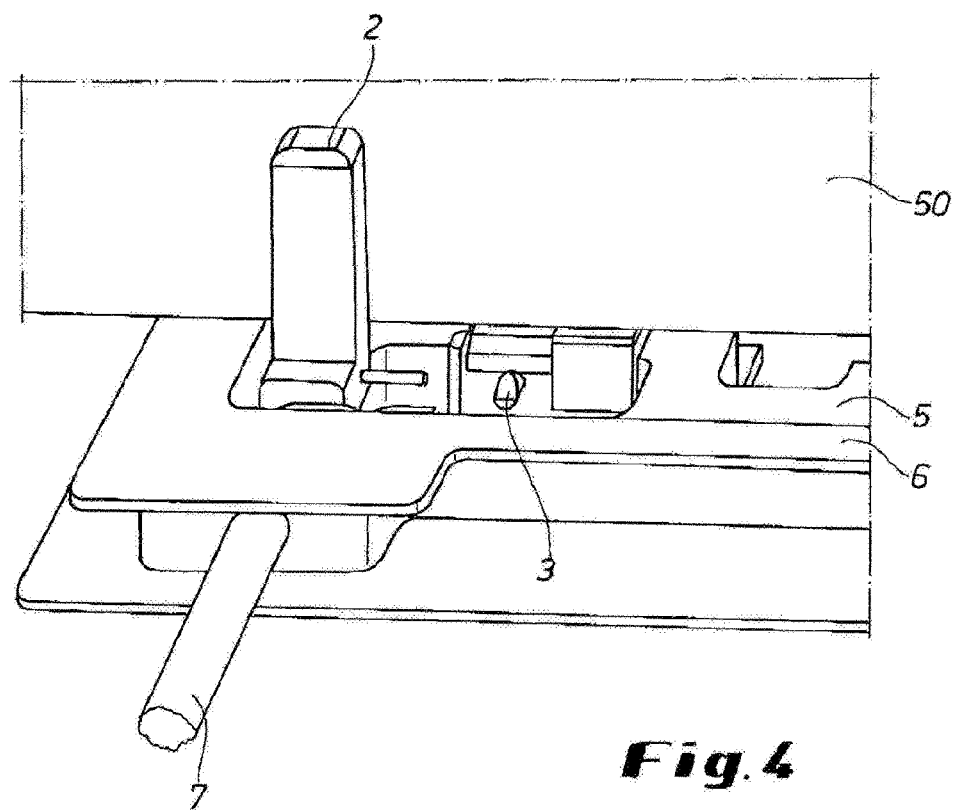
FIG. 4 is a perspective view of a part of a latch assembly with the safety latch in its raised end position securing a box according to one embodiment of the present invention.

FIG. 4 is a three-dimensional view of a part of the latch assembly 1 with the safety latch 2 in its raised end position securing a box 50 which pushes down the trigger latch 4. The securing member 3 is enabled and the spring 3F is relaxed.

Figure 5:
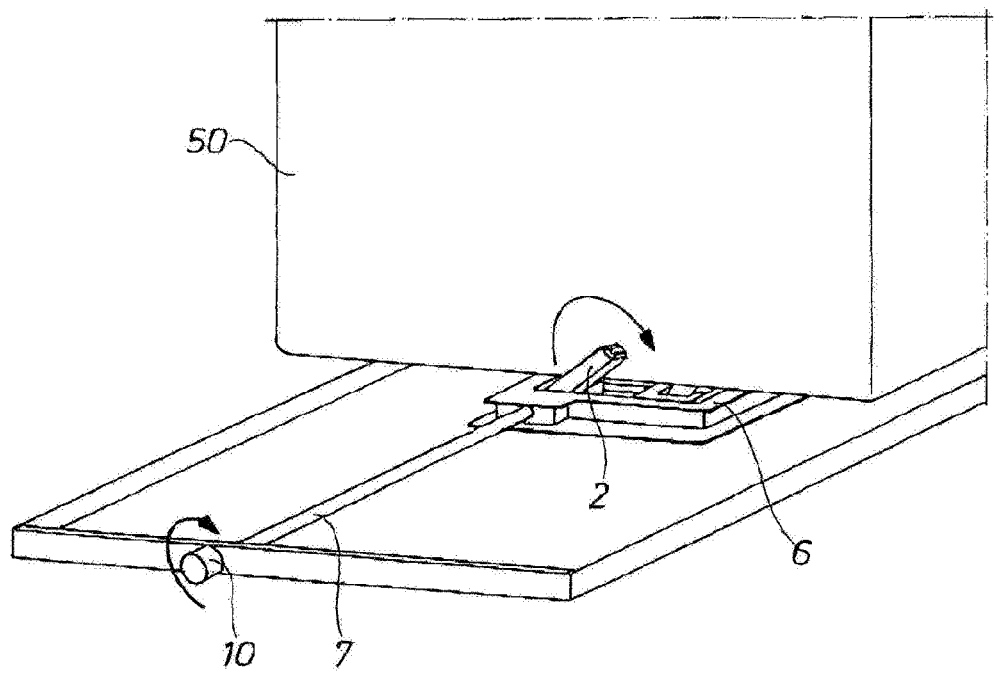
FIG. 5 is a perspective view of a part of a latch assembly with the safety latch reset from its raised end position into its lowered end position according to one embodiment of the present invention.

FIG. 5 is a three-dimensional view of a part of latch assembly 1 with the safety latch 2 moving from its raised end position into its lowered end position by being pivoted by the shaft 7. The trigger latch 4 is still pressed into its lowered end position by the box 50 placed upon it. Shaft 7 is rotated by rotating the resetting member 10. When reaching its lowered end position, the safety latch 2 will be secured by the enabled securing member 3 protruding as shown in FIG. 4.

Figure 6:
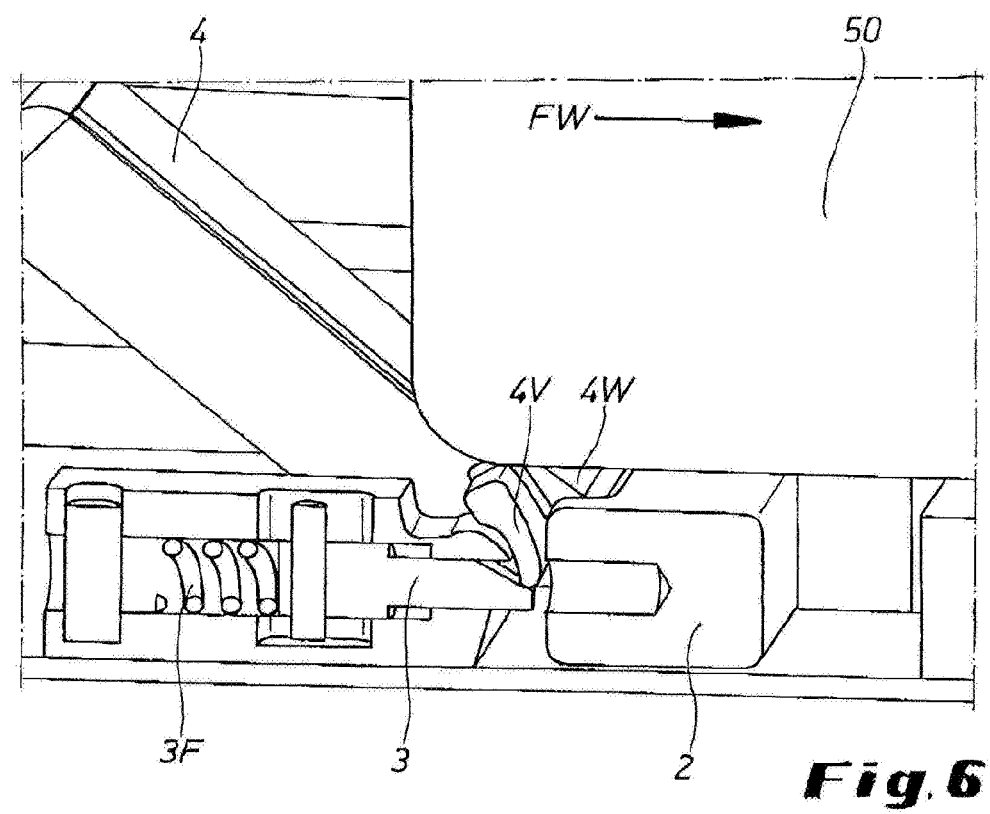
FIG. 6 is a three-dimensional cross-sectional view of a part of a latch assembly with the trigger latch pivoting to its raised end position according to one embodiment of the present invention.

FIG. 6 is a three-dimensional cross-sectional view of a part of the latch assembly 1 with the trigger latch 4 pivoting to its raised end position when the box 50 is removed from the latch assembly 1 in direction BW which is opposite to the insertion direction FW. During removal of the box 50 along direction BW, the safety latch 2 is pressed in its lowered end position by the bottom of the box 50. When the trigger latch 4 reaches its raised end position, the second projection 4V of the trigger latch 4 disables the securing member 3 by compressing the spring 3F. When the box 50 loses contact with the safety latch 2, the safety latch 2 will be clamped in its lowered end position by the first projection 4W of the trigger latch 4.

Figure 7:
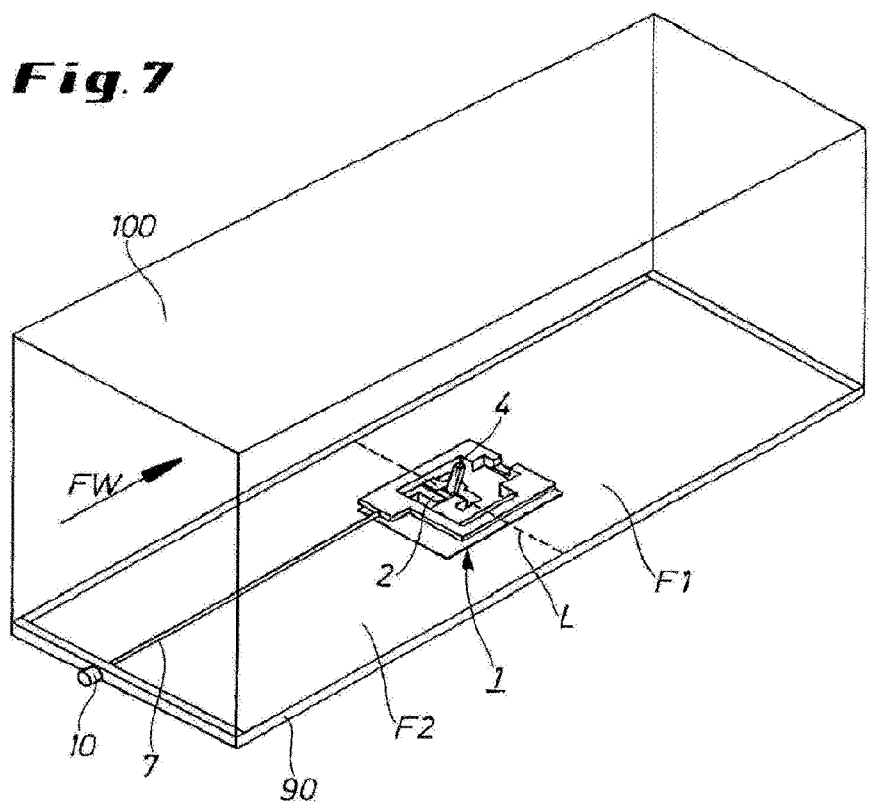
FIG. 7 is a three-dimensional view of a storage compartment according to one embodiment of the present invention.

FIG. 7 is a three-dimensional view of a storage compartment according to one embodiment of the present invention. The storage compartment 100 is adapted for storing two boxes (not shown) of the same size and shape which are to be inserted into the storage compartment 100 along the insertion direction FW. The storage position of the box to be inserted first is denoted by F1, and the storage position of the box to be inserted last is denoted by F2. According to one embodiment of the present invention, the latch assembly 1, shaft 7, and resetting member 10 are integrated into a bottom wall 90 of the storage compartment 100. The resetting member 10 extends to the front of the storage compartment 100 with its shaft 7. If a first box is inserted into the storage compartment 100 and is stored on the intended storage position F1, the trigger latch 4 of the latch assembly 1 will be pushed down, and the safety latch 2 will raise to its raised end position securing the first box in this storage position F1 by preventing any movement in reverse insertion direction past a position denoted by line L in FIG. 7.

Figure 8A:
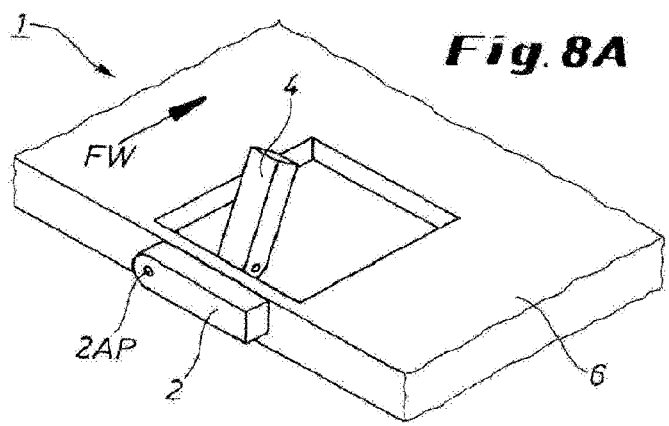
FIG. 8A and FIG. 8B are perspective views of a part of a latch assembly having a safety latch projecting from the remaining latch assembly according to a further embodiment of the present invention.
Figure 8B:
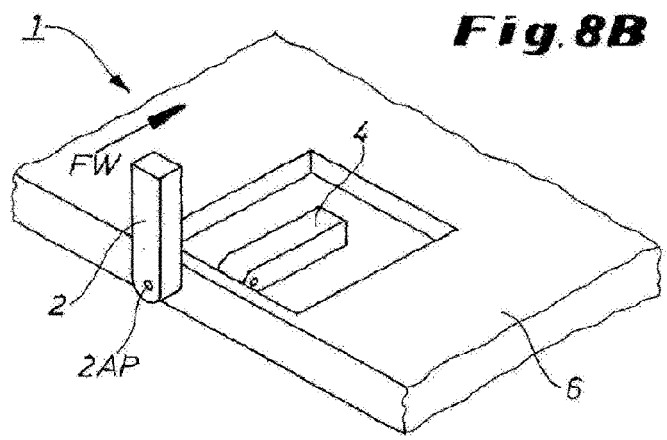

Both of FIG. 8A and FIG. 8B show a three-dimensional view of a part of a latch assembly having a safety latch projecting from the latch assembly. The safety latch 2 is supported pivotably about pivot point 2AP and projecting from the front side of the latch assembly 1. In FIG. 8A, the trigger latch 4 is in its raised end position, and the safety latch 2 is in its lowered end position. In the situation shown in FIG. 8B, the trigger latch 4 has been pushed, by a force of an inserted box (not shown) along insertion direction FW, from its raised end position into its lowered end position. Thus, the trigger latch 4 releases the safety latch 2, and the safety latch 2 raises, by pivoting about pivot point 2AP, to its raised end position for locking the inserted box (not shown) against movement reverse to the insertion direction FW. By manually pivoting the safety latch 2 clockwise for unlocking the locked box, the safety latch 2 will be reset from its raised end position into its lowered end position, and the inserted box (not shown) can be removed in a direction reverse to the insertion direction FW.

The invention claimed is:

1. In combination with a storage compartment for an airplane, a latch assembly for securing an object, the latch assembly comprising:
   a safety latch releasable to pivot about a first axis from a lowered end position into a raised end position for, in use with an object, locking the object against rearward movement after moving forward over the assembly;

a trigger latch adapted for fixing the safety latch in the lowered end position and pivotal about a second axis forming an angle of 45° to 135 to the first axis by forward movement of the object over the trigger latch for releasing the safety latch from the lowered end position, the safety latch being adapted to be pivotal about the first axis from its raised end position into its lowered end position for unlocking the object; and a securing member for, when enabled, securing the safety latch in the lowered end position, the trigger latch, when pivoted, first releasing the safety latch and subsequently enabling and/or disabling the securing member, whereby the latch assembly is integrated into a wall of the storage compartment.

2. The combination according to claim 1, wherein the trigger latch is adapted to be operated by pushing by an object in use with the latch assembly, of the trigger latch from a raised end position into a lowered end position.

3. The combination according to claim 1, wherein the first axis transversely crosses the second axis.

4. The combination according to claim 1, wherein at least one of the safety latch, the trigger latch, and the securing member is supported adjustably along an adjustment direction extending along the first axis.

5. The combination according to claim 1, wherein the latch assembly further comprises a resetting member operable for resetting the safety latch into a lowered end position, the resetting member being connected or connectable to the safety latch, or the safety latch being operable as the resetting member as a projecting component of the latch assembly.

6. The combination according to claim 1, wherein the storage compartment is for storing a box to be inserted into the storage compartment in an insertion direction and constituting the object, the safety latch and trigger latch being pivotal on the storage compartment.

7. The combination according to claim 6, wherein the storage compartment is constructed to hold at least two of the boxes insertable into the storage compartment successively in the insertion direction such that for each of the at least two boxes, except for the box being inserted last, actuates a respective individual latch assembly for locking the respective inserted box.

8. The combination according to claim 7, wherein an individual latch assembly is also provided for the box to be inserted last.

9. The combination according to claim 6, wherein the storage compartment is adapted for storing exactly two boxes to be inserted successively in the insertion direction, and a latch assembly is arranged in the storage compartment for locking, in use with the two boxes, the first inserted box.

10. The combination according to claim 6, wherein each safety latch is raisable transverse to the insertion direction by pivoting about a first axis extending in the insertion direction.

11. The combination according to claim 6, wherein each trigger latch is arranged in the storage compartment to be operable by insertion of a box.

* * * * *